3,801,684
INJECTION MOULDING
Klaus Schrewe, Leverkusen, Ullrich Knipp, Schildgen, and Akos Ravasz, Cologne, Germany, assignors to Imperial Chemical Industries Limited, Millbank, London, England
Filed Jan. 27, 1972, Ser. No. 221,251
Int. Cl. B29f 1/12
U.S. Cl. 264—40                    19 Claims

ABSTRACT OF THE DISCLOSURE

Sandwich moulding process wherein skin and core materials are sequentially injected into a mould cavity from separate injection barrels through a common sprue, skin material being caused to flow up the core feed channel, towards the core injection barrel while skin material is being injected into the mould cavity.

---

Figure 1:
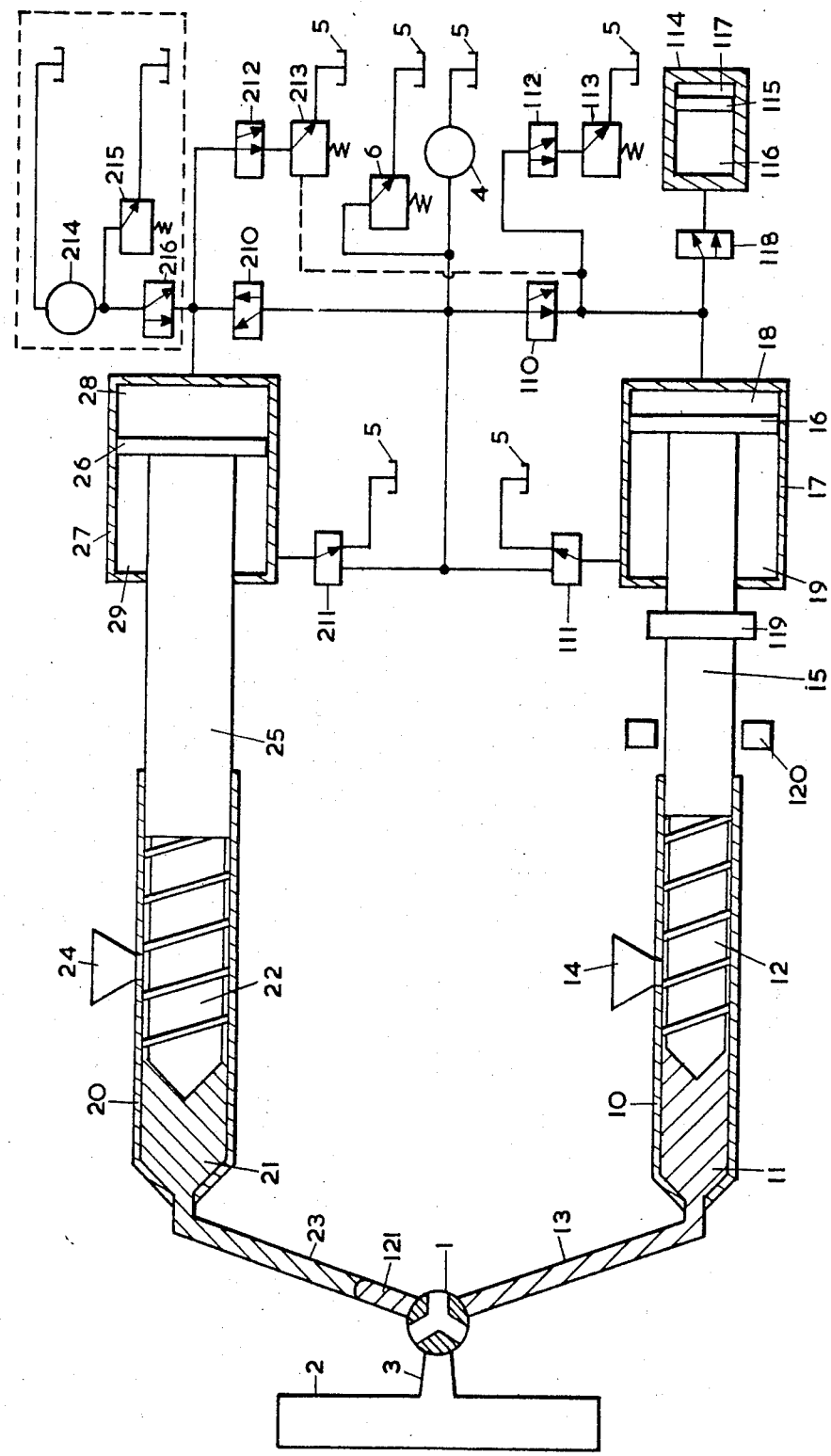

This invention relates to injection moulding and in particular to an injection moulding process for the production of articles having a sandwich structure of a skin of one material enclosing a core of a dissimilar material except at the sprue area of the moulding as discussed hereinafter.

It has been proposed to produce such articles from plastics materials by an injection moulding process wherein the plastics materials are sequentially injected into a mould cavity so that the second, and any subsequently injected material penetrates to within the first material and causes the enveloping first material to expand.

One such process is described in our British patent specification 1,156,217 wherein the core forming material is foamable.

In our British patent specification 1,219,097 we describe such a process wherein separate injection units are provided for each of the skin and core materials and a tape is provided to select which material is injected into the mould cavity.

It is desirable to provide an alternative system of switching from one material to the other so that the period during which both materials can be injected can be varied. This is not possible with a simple tap arrangement and to achieve a range of times during which both materials are injected a variety of tap designs are required.

The present invention works on the principle of having the feed channels from the skin and core injection units in communication with each other during the injection stage of the moulding cycle so that material can be caused to flow from one unit or the other merely by varying the pressures to which the skin and core materials are subjected. Because the skin and core materials in their respective feed channels are in communication with each other, there is a risk of contamination of one material with the other. Normally it is not important to avoid contamination of the core material by the skin material but the converse is not the case as contamination of the skin by the core material is liable to give rise to marks and blemishes on the final article. It is of course not necessary that the final part of the skin material that is injected into the mould is free of contamination by core material as this part will not occur on the surface of the moulding.

We have devised a process whereby such contamination may be avoided by providing that, during injection of the skin material, skin material, which initially occupies the sprue channel end of the feed channel through which the core material is supplied to the sprue channel, is caused to flow up the core material feed channel towards the core material injection unit.

In Japanese patent publication 70/02990 a process is described wherein different materials are sequentially injected into a mould cavity from separate injection units which are in communication with each other and the sprue channel end of the second material feed channel is occupied by a column of the first material during injection of the first material. This column is said to avoid contamination of the first material by the second. No provision is made for the control of movement of the column of first material during injection of the first material, although presumably, movement will occur due to the compression of the second material as the pressure in the sprue channel increases as the mould cavity fills.

We have found that generally it is desirable to control the movement of this column and the movement by virtue of the compression is generally not the optimum. Sufficient movement must be allowed to occur to prevent contamination. In some cases, particularly when the pressure generated in the sprue channel is relatively small during injection of the first, i.e. skin, material, the compression of the core material will be insufficient to allow enough movement of the column of skin material to avoid contamination of the skin material with core material.

In other cases, for example when there is a large volume of the core material capable of being compressed and/or high pressures are generated in the sprue channel, for example when moulding large area thin articles at high injection rates, the compression of the core material may permit far more movement of the skin material column up to the core feed channel than is desirable. Indeed in some cases the skin material may flow up the core feed channel into the core injection barrel wherein it is liable to become mixed with the core material.

It is therefore desirable to control the position of the interface between the skin material and the core material.

Accordingly, we provide a process for the production of an injection moulded article having a core of an injection mouldable synthetic resin material surrounded by a skin of an injection mouldable synthetic resin material at all points away from the sprue area of the moulding wherein the skin and core materials are sequentially injected in a fluid state into a mould cavity through a common sprue channel via feed channels from separate injection barrels by injection rams operating in said barrels so that the core material is injected to within the skin material thereby extending the enveloping skin material to the extremities of the mould cavity, said feed channels, during injection of the skin and core materials, being in communication with each other and with the common sprue channel and injection of skin material is commenced with the sprue channel end of the core material feed channel filled with skin material, characterized by, during injection of the skin material, controlling the position of the core material injection ram directly or indirectly in dependence on the amount of skin material injected so that skin material is caused to flow up the core material feed channel towards the core material injection barrel thereby substantially preventing contamination of the skin material being injected into the mould cavity by the core material, and, during injection of the core material, limiting flow of core material up the skin material feed channel to an amount not exceeding that corresponding to the compression of the skin material and any hydraulic fluid maintaining the skin material under pressure whereby contamination of the skin material forming the surface of the article by the core material is substantially prevented.

The amount of skin material injected may be monitored, and so used to control the position of the core material injection ram, by monitoring the position of the skin injection ram, or by monitoring the time elapsed from the start of injection of the skin material, or by monitoring the pressure somewhere in the system, e.g. that exerted on the skin material by the skin material injection ram, since the pressure increases as more skin material is injected.

The core material injection ram is preferably driven hydraulically by supplying hydraulic fluid under pressure to a cylinder in which a piston is slidably mounted, said cylinder or said piston, preferably the latter, being connected to the ram. Preferably the skin material injection ram is driven in like manner.

The position of the core material injection ram is preferably controlled hydraulically, by admitting hydraulic fluid to, or releasing fluid from, the cylinder associated with the core material injection ram. If no fluid pressurizing the cylinder is released, the ram will move backwards, away from the feed channel end of the injection barrel, as the pressure in the material being injected increases by virtue of the compression of the hydraulic fluid pressurizing the cylinder. The position of the ram is thus not under any control. In the present invention, when using a hydraulically driven core material injection ram, the amount of hydraulic fluid in the cylinder is varied; i.e. fluid is supplied to, or released from, the cylinder, during injection of the skin material and the amount of hydraulic fluid released from, or supplied to, the cylinder is determined, directly or indirectly, by the amount of skin material injected.

Conveniently the supply of fluid to, or released from, the cylinder associated with the core material injection ram is determined by the pressure exerted on the skin material injection ram if the latter is hydraulically driven and this pressure can be utilized to control the amount of fluid supplied to, or released from the cylinder by controlling the pressure in the cylinder. Thus, where fluid is to be released from the cylinder, i.e. where the core injection ram is to move backwards to a greater extent than would occur if the fluid was merely compressed, the fluid may be released through a valve which operates when the pressure in the cylinder associated with the core injection ram exceeds a level determined by the pressure to which the skin material injection ram is subjected.

Where fluid is to be supplied to the cylinder associated with the core material injection ram, i.e. to cause the ram to move forwards, remain stationary, or move backwards to a lesser extent than would occur if the fluid was merely compressed, fluid may be supplied continuously to the cylinder by a pump at least during injection of the skin material and the excess released through such a pressure operated valve. It will be appreciated that if, as often will be the case, the skin and core material injection rams are driven by hydraulic cylinders of different diameter to the injection rams, the pressure on the rams will be determined by the ratio of the ram/cylinder areas and the pressure in the cylinders. By making the ratios for the skin and core material injection units different, e.g. by using a larger diameter injection ram for the core material and the same size cylinders for each unit, as may often be the case, the pressure in the cylinders may be the same and yet the pressure to which the skin material injection ram is subjected may be greater than that to which the core material injection ram is subjected.

The amount of flow of skin material up the core material feed channel should be such that the core material cannot diffuse in a direction against the flow of the skin material and hence contaminate the skin material being injected into the mould cavity.

The amount of flow of skin material that should be allowed or caused to occur may be determined by a few trial mouldings to find the optimum for any given set of injection conditions. Where the control is affected automatically by means of a pressure operated valve as described above, we prefer that the valve is adjustable so that the amount of flow that is allowed to take place can be varied.

During injection of the core material, the flow of core material up the skin material feed channel towards the skin material injection barrel is limited to less than that which would occur by compression of the skin material and any hydraulic fluid holding the skin material under pressure: i.e., if the skin material injection ram is hydraulically driven, then the flow or core material up the skin material feed channel brought about by compression by the core material being injected must be equal to or less than that corresponding to the compression of the skin material and the hydraulic fluid. Where flow of core material up the skin material feed channel by an amount equal to the compression of the skin material and the hydraulic fluid maintaining the skin material under pressure is small enough to avoid contamination of the skin material by the core material, the movement may be limited to this amount by preventing release of hydraulic fluid maintaining the cylinder associated with the skin injection ram under pressure.

It will be appreciated that, while, during skin material injection, skin material is caused to positively flow up the core material feed channel in order to avoid contamination, the amount of flow of core material up the skin material feed channel, during core material injection, should be smaller than the amount of flow of skin material up the core material feed channel during skin material injection. Thus where, during skin material injection, the amount of skin material flowing up the core material feed channel is less than that corresponding to compression of the core material and any hydraulic fluid holding the core material under pressure, the amount of flow of core material up the skin material feed channel, during core material injection, may have to be limited to considerably less than the compression of the skin material in the injection barrel and any hydraulic fluid holding the skin material under pressure.

This may be achieved by preventing movement of the skin injection ram in a direction away from the feed channel end of the skin material injection barrel, and hence eliminating movement of the core material up the skin material feed channel due to compression of the hydraulic fluid holding the skin material under pressure, or by limiting the amount of skin material that can be compressed. As the core material is injected after the skin material, the skin injection barrel will not be full, although as described hereinafter, it may contain some skin material, and so, inherently, it is likely that there is less skin material available to be compressed. The amount of skin material available for compression may, alternatively be limited by providing a nonreturn valve in the skin material feed channel between the skin material feed channel between the skin material injection barrel and the junction of the feed channels i.e. the common sprue channel.

Where the amount of core material flowing up the skin material feed channel is limited by preventing movement of the skin material injection ram away from the feed channel end of the skin material injection barrel, this movement may be prevented by applying to the skin material injection ram a higher pressure than the highest pressure applied to the core material injection ram during core material injection. In such a case where it is not desired to cause the skin injection ram to move forward during core material injection, it will be necessary to provide a limit stop against which the skin material injection ram abuts to prevent forward movement of the injection ram under the higher pressure applied thereto.

The starting condition, i.e. with the sprue channel end of the core material feed channel filled with skin material, may conveniently be achieved by injecting a further quantity of skin material after injecting the core material.

Conveniently this may be achieved by releasably locking the skin material injection ram during core material injection so that, on releasing the lock, the skin material injection ram can further forward to inject a further quantity of skin material. An alternative method of injecting the further amount of skin material, when using a screw skin injection ram capable of rotational and reciprocating movement, is, at the end of the injection of the first charge of skin material, or at the end of injection of the core material if the skin injection ram is forced forwards during core material injection, to provide that the skin injection ram is prevented for moving further forward, for example by abutment with a stop, and then to rotate the screw veyed that a further quantity of skin material is screw-conveyed to the feed channel end of the skin material injection ram and, since the ram is under pressure, such that it will not be forced backwards, the further quantity of skin material is forced into the feed channel and injected. Injection of the further quantity of skin material has the additional advantage that a small amount of skin material will be injected into the mould to within the core material and so, on removal of the moulded article from the mould cavity and on removal of the sprue, i.e. the material moulded in the sprue channel, from the article, the exposed sprue area of the moulding will consist essentially of skin material, with only a narrow annulus of exposed core material. This annulus may in fact be made so narrow, e.g. by heating the sprue channel and/or the use of high injection rates, that it is virtually invisible.

After injection of the skin and core materials, the mould cavity is preferably isolated from the feed channels, and also, preferably, the skin and core material injection barrels are isolated from each other, by operating one or more suitably positioned shut off taps. This enables the moulding to be removed from the mould cavity and the injection units returned to the starting position for the next moulding cycle without the necessity of freezing off the material in the feed channels. Where the feed channels are isolated from each other, the skin and core material injection units can be returned to their starting positions independently of each other without disturbing the position of the interface of the skin and the core materials. A single tap may be provided at the junction of the feed channels and the sprue channel or, alternatively, separate taps may be provided in each feed channel.

As mentioned hereinbefore, it is possible to commence injection of core material before injection of skin material is completed.

It will be appreciated that the time during which both materials are being injected i.e. the time of "overlap" of injection, may be varied at will. Thus the overlap time may vary from no overlap (indeed there may be, if desired, a pause between injection of skin material and injection of core material) to nearly the total skin material injection time. How large an overlap can be tolerated before the core material bursts through the skin material can readily be determined by simple experimentation. Some overlap is to be desired as this minimizes the formation of hesitation marks on the moulding which occur at the place on the surface where there is a marked deceleration followed by acceleration of the advancing melt front as the supply is switched from injection of core material.

Where there is "overlap" of injection of the skin and core materials and movement of the core material up the skin material feed channel is limited by preventing movement of the skin material injection ram away from the feed channel end of the skin material injection barrel, the backwards movement of the ram may be prevented by bringing the skin material injection ram to a halt, isolating the hydraulic supply to the skin material injection ram from that supplying the core material injection ram and applying pressure from an accumulator pressurized to above a pressure above the highest pressure applied to the core material injection ram during core material injection to the skin material injection ram.

Where this system is used, and a further amount of skin material is injected by releasing a lock preventing the skin material injection ram from forward movement, the accumulator may be pressurized, in readiness for the next injection cycle, during injection of the further amount of skin material as the pressure required to inject this further amount of skin material will exceed the highest pressure applied to the core material injection ram during core material injection.

In accordance with the present invention we further provide an injection apparatus for an injection molding machine comprising an injection unit for a first material and an injection unit for a second material, each injection unit comprising an injection ram reciprocatably mounted in an injection barrel and a feed channel connected to the injection barrel, said feed channels being arranged to be in communication with each other and with a common sprue channel during injection of materials from the injection barrels, and control means to control the position of the ram in the second material injection unit during injection of the first material in dependence on, directly or indirectly, the amount of first material injected, and limiting means to limit the flow of the second material up to the feed channel of the first material injection unit during injection of the second material.

Figure 2:
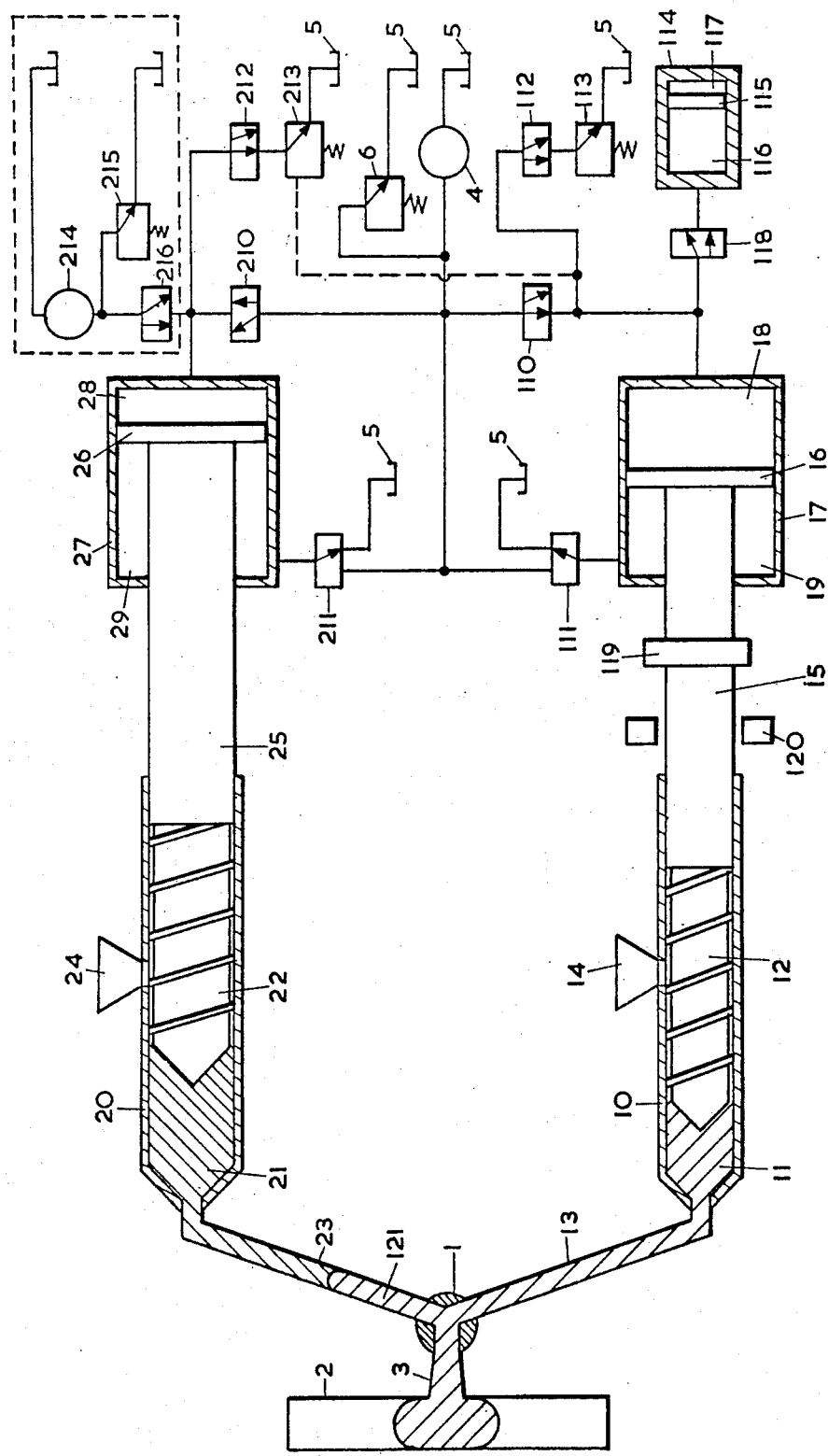
Figure 3:
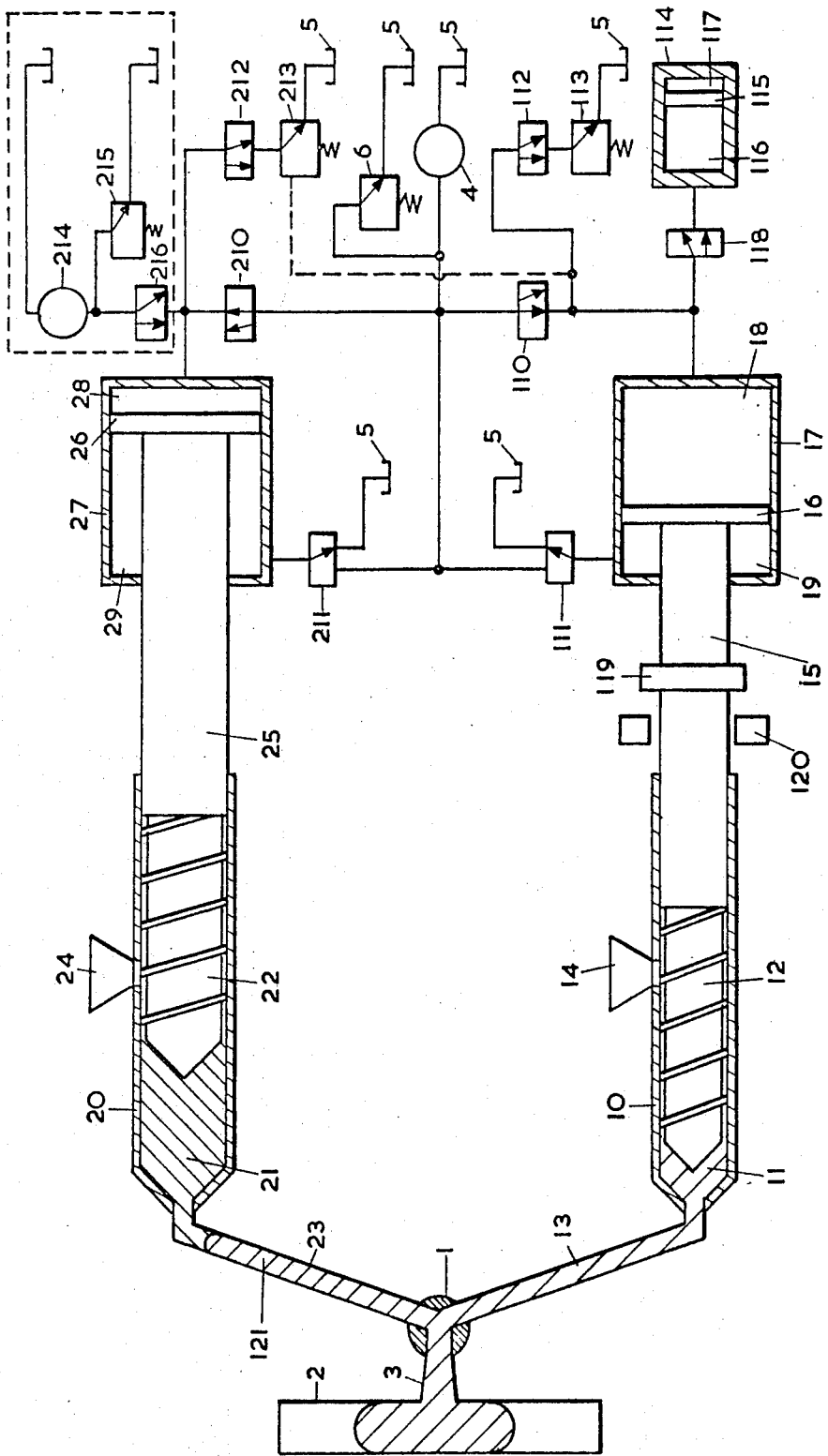
Figure 4:
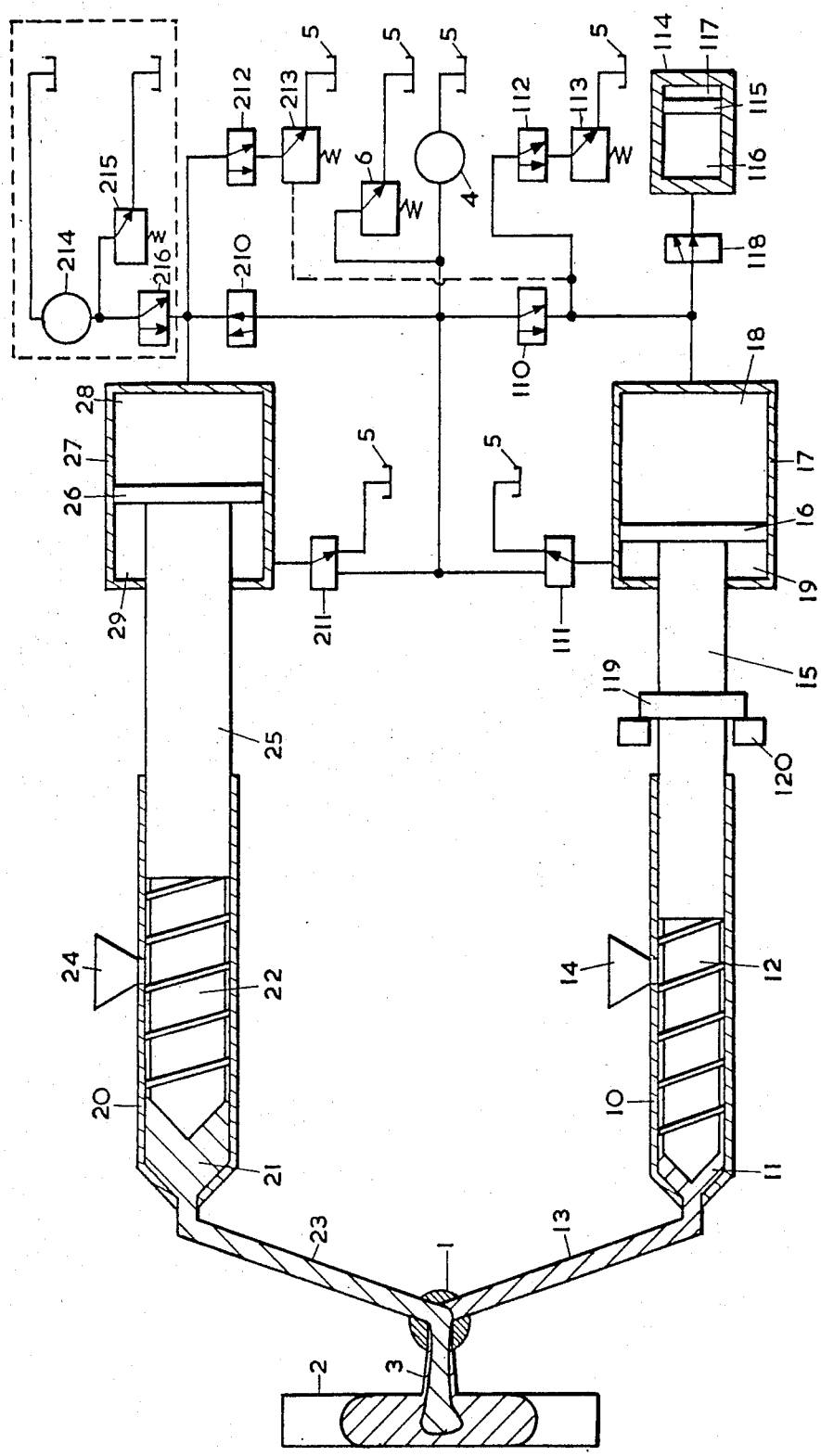
Figure 5:
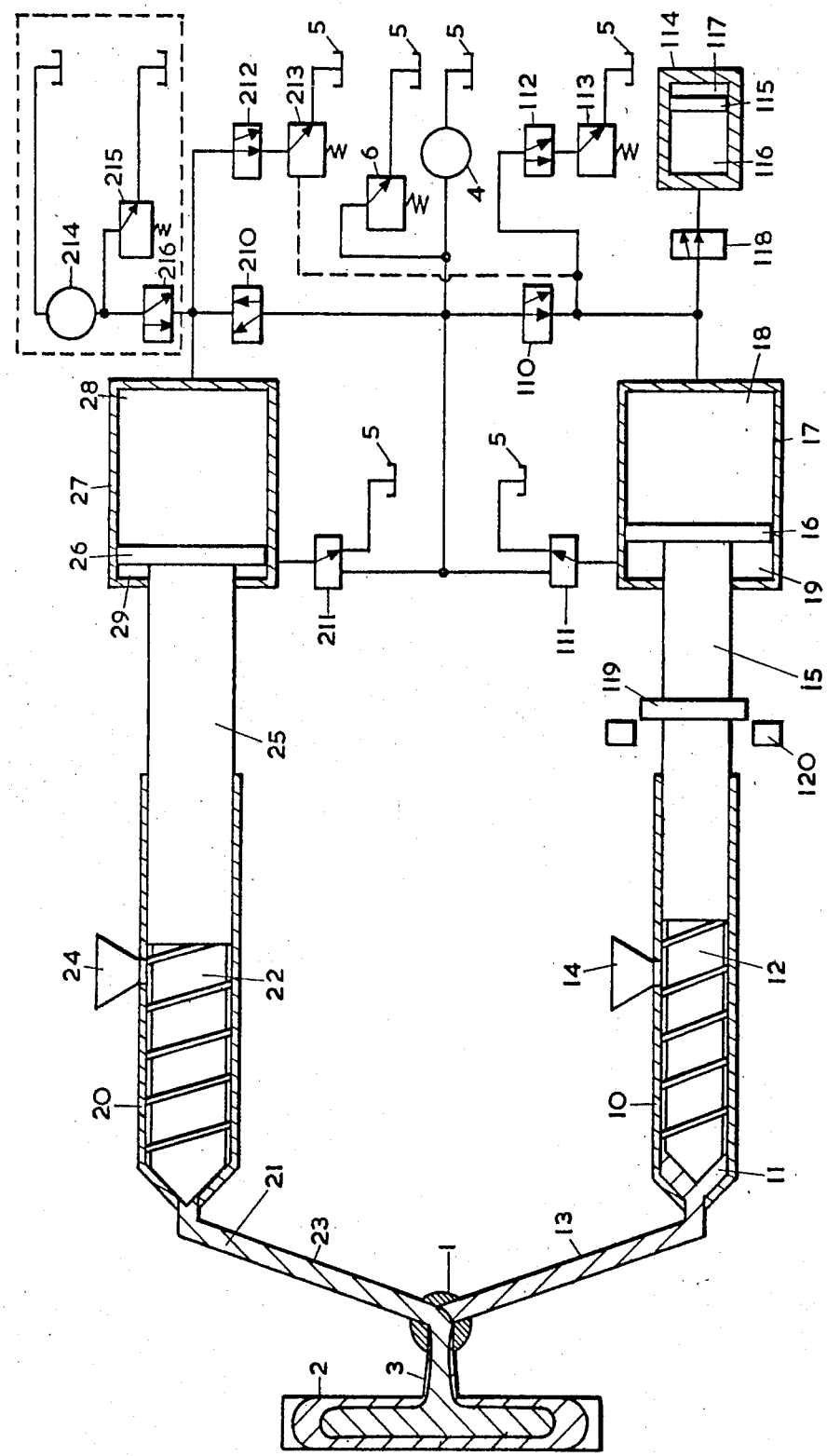
Figure 6:
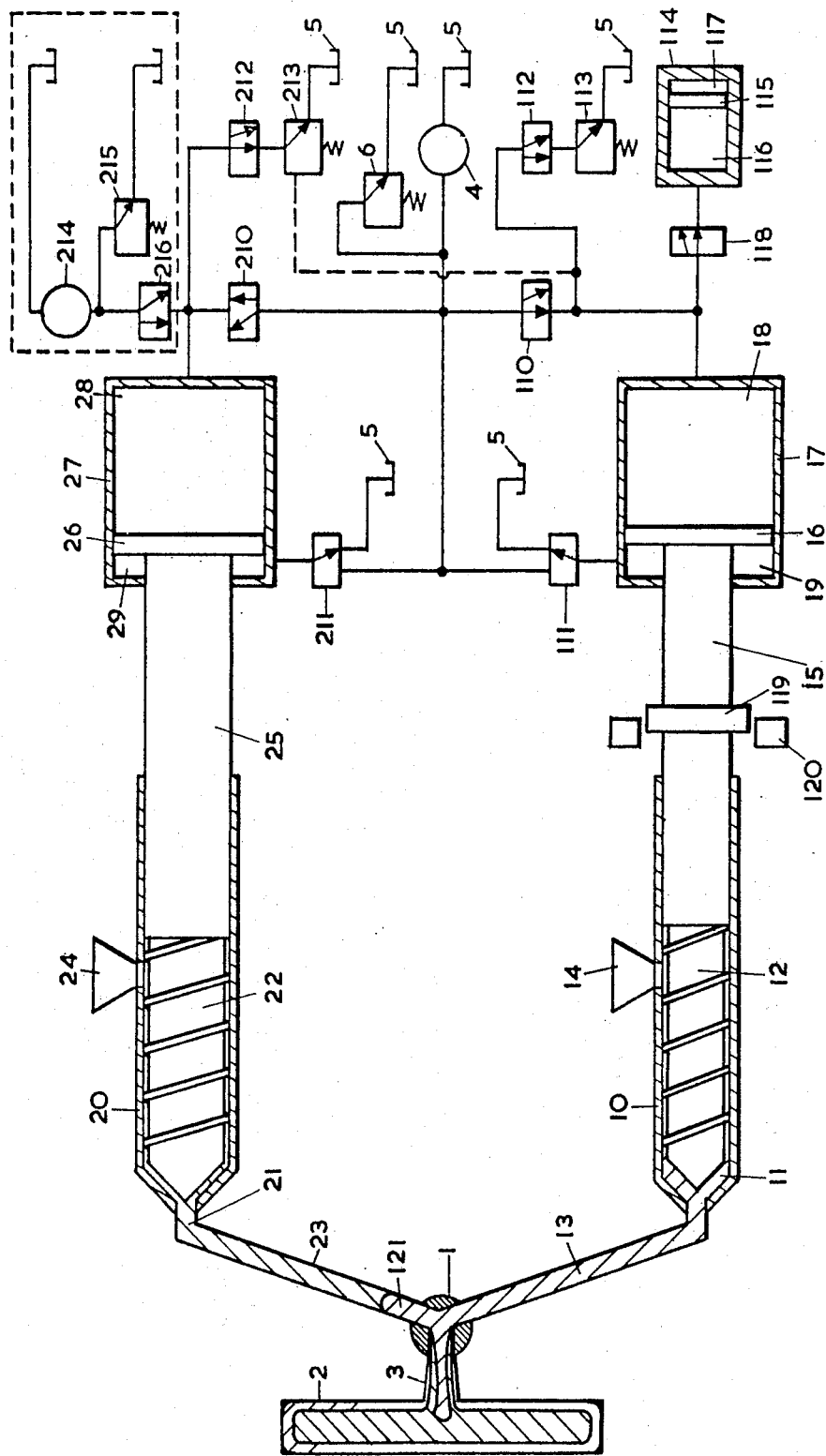
Figure 7:
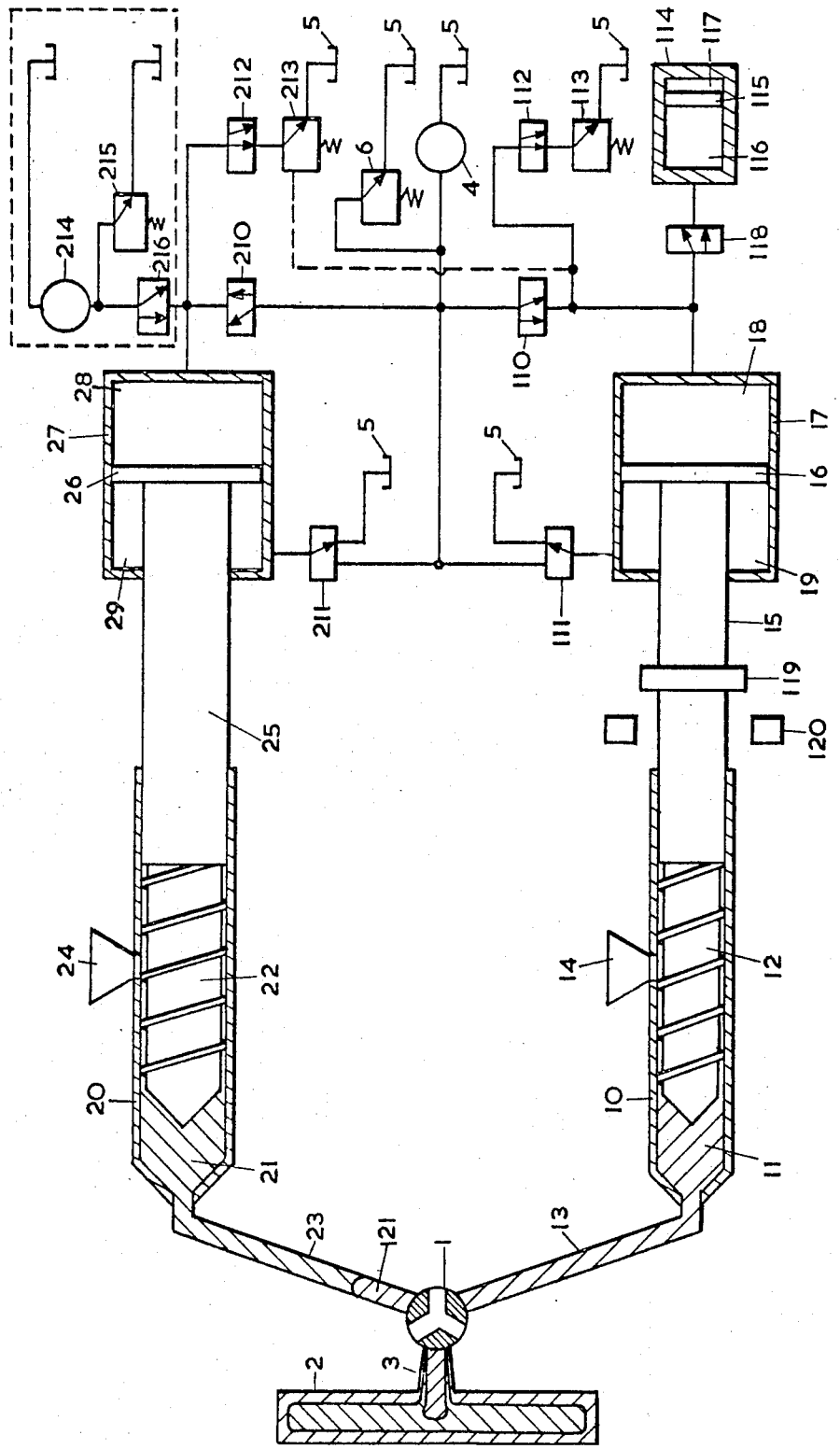

One embodiment of the invention is illustrated by way of example, with reference to the accompanying drawings wherein:

FIG. 1 is a diagrammatic layout of the machinery and associated hydraulics system showing the system ready for start of the injection cycle, FIG. 2 is a diagram similar to FIG. 1 showing the system while the skin material is being injected, FIG. 3 is a diagram similar to FIGS. 1 and 2 showing the system at the start of injection of the core material, FIG. 4 is a diagram similar to FIGS. 1 to 3 showing the system when core material is being injected after cessation of skin injection, FIG. 5 is a diagram similar to FIGS. 1 to 4 showing the system at the end of injection of the core material with the further quantity of skin material about to be injected, FIG. 6 is a diagram similar to FIGS. 1 to 5 showing the system during injection of the further amount of skin material, FIG. 7 is a diagram similar to FIGS. 1 to 6 showing the system after injection of the further amount of skin material and during the cooling cycle showing the injection barrels being recharged.

In this embodiment the core material injection ram is permitted to move backwards as the skin material is injected, while the skin material injection ram is prevented from backward movement during injection of core material.

The machine comprises two injection barrels 10, 20 from which the skin, 11, and core, 21 materials respectively may be forced, by reciprocating screws 12, 22, through associated feed channels 13, 23 into a tap 1 and thence into a mold cavity 2 via a space channel 3. Injection barrels 10 and 20 and their associated screws are of different internal diameters, barrel 20 being greater in diameter than barrel 10. Skin and core material is supplied to screws 12, 22 respectively via feed hoppers 14, 24. The screws can be rotated by motors (not shown) and forced forwards by rams 15, 25. Rams 15, 25 are driven hydraulically by pistons 16, 26 acting in cylinders 17, 27. Pistons 16, 26 divide the cylinders into compartments 18, 28 and 19, 29 respectively.

Hydraulic fluid can be supplied by a pump 4, from a reservoir 5, to one compartment 18, 28 of the cylinders 17, 27 via valves 110, 210. [Hydraulic fluid can also be supplied, in an emergency, to the other compartments 19, 29 of the cylinders 17, 27 via valves 111, 211.] Pump 4 normally operates continuously and when delivering fluid at a pressure above a certain limit, the fluid is returned to the reservoir 5 via a relief valve 6. The hydraulic fluid in compartments 18, 28 of the cylinders 17, 27 can be released to the reservoir 6 via valves 112, 212 and pressure dependent valves 113, 213.

As explained hereinafter a second pump 214 and an associated relief 215 may be provided to supply hydraulic fluid to compartment 28 of cylinder 27 via a valve 216. As explained hereinafter this pump and associated relief valve may be used in addition to pump 4 or the supply from pump 4 to compartment 28 of cylinder 27 through valve 210 may be omitted. In the embodiment now described however, the pump 214 and valves 215 and 214 are omitted.

An accumulator 114 consisting of a piston 115 dividing the accumulator into two compartments 116, 117 is provided in the hydraulics circuit for the skin injection unit. Compartment 116, containing hydraulic fluid, is connected to compartment 18 of cylinder 17 via a valve 118. The other compartment, 117, contains gas and is sealed.

A collar 119 is provided on ram 15 and this can abut against an axially adjustable limit stop 120 which can be moved out of engagement with collar 119. When collar 119 abuts against the limit stop 120, the ram cannot move forward.

At the start of the cycle oil is pumped at a constant volume rate into compartment 18 of cylinder 17 via valve 110 until the pressure is such that relief valve 6 causes the excess of oil to vent to the reservoir 5.

Compartment 28 of cylinder 27 is initially maintained at a predetermined pressure [conveniently it is pressurized to the same pressure as compartment 18 of cylinder 17 by having valve 210 open and valve 212 closed and then valve 210 is closed and valve 212 opened so that the core material hydraulics system is closed except for a relief valve 213—which is set to open when the difference between the pressure in compartment 18 of cylinder 17 and compartment 28 of cylinder 27 is a predetermined amount.] The system is then as shown in FIG. 1.

Shut-off valve 1 is opened, and so the pressure in the melt at the sprue channel end of skin feed channel 13 drops (to atmospheric if the mould 2 is at atmospheric pressure). Because of the pressure difference between the sprue channel end of feed channel 13 and barrel 10, skin material 11 is injected. Ram 15 thus moves and more oil is pumped into compartment 18 thus maintaining the pressure necessary to cause the skin material 11 to flow. While a pressure drop will also occur in feed channel 23, only little flow of core material takes place since no oil is pumped to compartment 28 of cylinder 27 and so ram 25 cannot move forward. The pressure of the core material 21 in barrel 20 thus drops to that of the junction of the feed channels 13 and 23. Ram 15 moves at constant displacement rate as the oil is pumped at constant rate. As the pressure in the mould builds up so does that at the junction of feed channels 13 and 23. The pressure at the junction thus exceeds that in the core barrel 20 and so a small amount 121 of skin material 11 flows up the core feed channel 23 towards the core barrel 20. This flow is controlled by permitting ram 25 to move backwards by bleeding oil out of compartment 28 of cylinder 27 through valves 212 and 213. Flow will also occur since the core melt 21 will compress. The system is then as in FIG. 2.

When a predetermined amount of skin material 11 has been injected, valve 212 is closed and then valve 210 is opened so that oil is now pumped to both compartment 18 of cylinder 17 and compartment 28 of cylinder 27. The skin injection ram 15 thus decelerates and the core injection ram 25 accelerates. The system is now as depicted in FIG. 3. Thus injection of core material 21 commences while the skin material 11 is still being injected. The collar 119 on skin injection ram 15 then abuts against the limit stop 120 so stopping injection of skin material 11. Valve 110 is then closed and the accumulator valve 118 is opened so that the skin hydraulics circuit is a closed system. The hydraulic fluid in compartment 116 had previously been compressed to substantially the full pressure permitted by relief valve 6, so causing piston 115 to compress the gas in compartment 114. This gas thus tries to expand and so the full pressure is applied from accumulator 114 to compartment 18 of cylinder 17. This thus prevents backwards movement of skin injection ram 15 as the pressure in compartment 28 of cylinder 27 will not reach the maximum pressure permitted by relief valve 6, and, also, as the pressure of the skin material in barrel 10 cannot be greater than that of the core material 21, and as core barrel 20 is of greater diameter than skin barrel 10, the pressure in compartment 18 of cylinder 17 must always be greater than that in compartment 28 of cylinder 27. Thus core material 21 can only flow up the skin feed channel 13 by compression of the melt of skin material. The system is now as depicted in FIG. 4.

If no "overlap" injection of the skin and core materials 11 and 21 is required, then as soon as collar 119 abuts against limit stop 120, compartment 18 of cylinder 17 is pumped up to full pressure, the excess of hydraulic fluid oil being pumped via relief valve 6 to the reservoir 5 (if no "overlap" of injection is required, there is no need for the accumulator valve 118 and indeed for the accumulator 114 as the oil in compartment 18 of cylinder 17 would act as its own accumulator), valves 110 and 212 are then closed and then valve 210 is opened to cause injection of core material.

[Alternatively, since the barrel 20 is of greater diameter than barrel 10, and the back pressure in the skin material 11 forcing ram 15 to move back cannot exceed that exerted on the core material 21 by ram 25, valve 110 may be maintained open during core material injection as the back pressure exerted on the fluid in compartment 18 of cylinder 17 cannot exceed the pressure prevailing in compartment 28 of cylinder 27. In this way the use of accumulator 114 and valve 118 during core material injection is not required and the accumulator can instead, if desired, be used to provide initial impetus to the skin material injection].

When injection of core material 21 is completed, valve 110 is opened and limit stop 120 is retracted, valve 210 is shut and valve 212 opened. The ssytem is now as shown in FIG. 5. The compressed gas in compartment 117 of accumulator 114 also expands forcing piston 115 forward hence feeding oil to compartment 18 of cylinder 17. In this way injection of the further amount of skin material is given initial added impetus. Skin ram 15 thus moves forward, injecting more skin material 11 and causing some, 121, to flow up core feed channel 23 as ram 25 is retracted slightly by bleeding oil from compartment 28 of cylinder 27 through valves 212 and 213. The system is then as shown in FIG. 6. The full injection pressure is generally required in compartment 18 of cylinder 17 to inject the final amount of the skin material 11 and so the compartment 116 of the accumulator 114 is charged to the full pressure at the same time. The shut off valve 1 and accumulator valve 118 are then closed and the moulding cooled and removed from the mould cavity 2. While the cooling is taking place, valve 110 is closed, valve 112 is opened and the rams 15 and 25 are retracted by screwing back the screws 12 and 22 to recharge the injection barrels 10 and 20 with skin and core materials from hoppers 14 and 24 respectively. The system is as shown in FIG. 7 during the screw back stage. When the barrels 10 and 20 are filled, i.e., pistons 16 and 26 are retracted, valves 112 and 212 are closed, valves 110 and 210 are opened to pressurize the system in readiness for the next injection cycle.

[Valves 111 and 211 are normally open to the reservoir 5 and need only be operated in an emergency to force the rams 15 and 25 back, should this become necessary.]

If it is desired to move ram 25 forward during core material injection, then, as mentioned hereinbefore, a second pump 214 is used to continually pressurize compartment 28 of cylinder 27 during skin material injection. If this pump 214 is also used for injection of the core material, then the supply to cylinder 27 from pump 4 via valve 210 can be omitted.

Plastics materials that may be used in the present invention are those which can be injected into a mould cavity while in the state of a viscous liquid and which can thereafter be caused to solidify in the mould cavity. Thus thermoplastic resinous materials may be used which can be injected in the form of viscous melts and allowed to solidify in the mould cavity by cooling. Alternatively thermosetting resinous materials may be used which can be injected into the mould cavity in the state of a viscous liquid and then caused to solidify by effecting cross-linking while in the cavity. Generally the thermosetting resinous materials are cross-linked by heating.

Examples of suitable injection mouldable thermoplastic resins which may be used include polymers and copolymers of α-olefins, such as high and low density polyethylene, polypropylene, polybutene, poly-4-methyl pentene-1, propylene/ethylene copolymers, copolymers of 4-methyl pentene-1 with linear α-olefines containing 4 to 18 carbon atoms, and ethylene/vinyl acetate copolymers; polymers and copolymers of vinyl chloride, vinyl acetate, vinyl butyral, styrene, substituted styrenes such as α-methyl styrene, acrylonitrile, butadiene, methyl methacrylate, vinylidene chloride. Specific examples of such polymers include vinyl chloride homopolymers and copolymers of vinyl chloride with vinyl acetate, propylene, ethylene, vinylidine chloride, alkyl acrylates such as 2-ethyl hexyl acrylate, alkyl fumarates, alkyl vinyl ethers, such as cetyl vinyl ether, and N-aryl maleimides such as N-o-chlorophenyl maleimide; polyvinyl acetate, polyvinyl butyral; polystyrene, styrene/acrylonitrile copolymers; polyacrylonitrile; copolymers of butadiene with methyl methacrylate and/or styrene and optionally acrylonitrile; polymethyl methacrylate; copolymers of methyl methacrylate with with minor amounts of alkyl acrylate such as methyl acrylate, ethyl acrylate and butyl acrylate; copolymers of methyl methacrylate, N-aryl maleimides and optionally styrene; and vinylidene chloride/acrylonitrile copolymers, melt processable copolymers of tetrafluoroethylene and hexafluoropropylene.

Halogenated polymers or copolymers may be used; for example halogenated α-olefine polymers, such as chlorinated polyethylene, or halogenated vinyl chloride polymers, such as chlorinated polyvinyl chloride.

Other injection mouldable thermoplastic polymers that may be used include condensation polymers such as the injection moulding grades of linear polyesters such as polyethylene terephthalate; polyamides such as polycaprolactam, polyhexamethylene adipamides and copolyamides such as copolymers of hexamethylene diamine adipate and hexamethylene diamine isophthalate, particularly those containing from 5 to 15% by weight of hexamethylene diamine isophthalate; polysulphones and copolysulphones; polyphenylene oxides; polycarbonates, thermoplastic polymers and copolymers of formaldehyde; thermoplastic linear polyurethanes; and the thermoplastic derivatives of cellulose such as cellulose acetate, cellulose nitrate and cellulose butyrate and mixed cellulosic esters, for example cellulose acetate butyrate.

Where a copolymer is used, the amounts of the comonomers that are used in the copolymer will depend, inter alia, on the properties required of the moulding.

Thermosetting resins include plastics materials that either undergo cross-linking of their own accord or in the presence of a hardener or catalyst when heated to a sufficiently high temperature. Thus the term includes a material falling within the commonly understood ambit of the term "thermosetting," and also a plastics material which is normally thermoplastic but contains a cross-linking agent such as a peroxide which causes cross-linking when the plastic is heated to a sufficiently high temperature.

Examples of suitable thermsetting resins that may be used include phenol-aldehyde resins, amine-formaldehyde resins, epoxy resins, polyester resins, thermosetting polyurethanes, and vulcanizable rubbers.

The resins may contain a hardening agent or catalyst where this is nscessary to enable the resin to set.

Injection mouldable cross-linkable thermoplastics include copolymers of methyl methacrylate and glycol dimethacrylate and ethylene/vinyl acetate copolymers containing a cross-linking agent.

Blends of plastics materials may be used.

The choice of materials from which the article is to be made will depend upon the use to which the article is to be put. The process of the present invention does, however, provide a particularly useful way of producing articles having a core of relatively cheap material provided with a good facing. For example, the core may be of a thermoplastic material containing a filler whereas the outer skin of a material may provide any desired surface finish. If the process is used to produce parts of the bodies of motor vehicles then a stiff outer skin will be required and filled polypropylene is a particularly good resin from which to form the outer skin. However, if a flexible moulding is required, for example, for the interior trim of a motor car then plasticized vinyl chloride polymer will be eminently suitable as the outer layer of the moulding.

The proportions of the skin and core materials used will depend on a variety of factors but it will be appreciated that for any given materials, mould configuration and processing conditions e.g., temperatures, pressures, there will be a minimum amount of skin material that has to be injected before the commencement of injection of core material in order to avoid the core material bursting through the skin. This minimum can readily be determined by a few trial mouldings.

The core material may be the same as the skin material with the exception of additives which are included in one or in the other of the materials or in both but in different proportions. Alternatively the plastics may be quite different and also may contain different additives.

In a preferred embodiment, the skin material is non-foamable and the core material is foamable. Preferably the core material contains a blowing agent that evolves a gas on heating above a certain temperature, herein termed the activation temperature, e.g. by volatilization (when the pressure on the composition is reduced) or by decomposition, and is injected at a temperature above the activation temperature of the blowing agent. It is preferred that the plastics material is heated to the foaming temperature, i.e. to above the activation temperature as it is injected into the sprue channel, by relying on the dynamic heating occurring as the material passes through the injection nozzle of the injection moulding machine.

If the core material is injected at the customary injection rates and pressures used in injection moulding, substantially no foaming will occur until the desired amount of core material has been injected. When using a foamable core material, two alternative modes of operation may be utilized. In the first, the amount of skin material and foamable, but as yet unfoamed, core material injected is insufficient to fill the mould cavity and the core material is allowed to foam, at the same time extending the enveloping skin material to the extremities of the mould cavity. In the second mode of operation, the amount of skin material and foamable, but as yet unfoamed, core material injected is such that the cavity is filled before substantial foaming takes place, and the mould cavity is then enlarged to permit foaming to occur.

It is preferred to use the second of these alternatives as this provides a more regular cell structure in the core of the moulded article and also produces an article with superior surface finish.

In this preferred embodiment for the production of foamed mouldings as set out above, the enlargement of the mould cavity may be effected in one of two ways. One or more of the mould members defining the mould cavity may be retracted by some external force which may instantaneously enlarge the cavity to the desired extent or may gradually enlarge the cavity. Alternatively, when using a vertical flash mould, the clamping pressure holding the mould halves together may be reduced so that the pressure of the gases generated by the decomposition or volatilization of the blowing agent will enlarge the mould cavity; here again the locking pressure may be reduced gradually allowing a gradual expansion of the mould cavity or reduced instantaneously allowing a sudden expansion.

The design of the mould should be such that there is minimum loss of material from the mould during the moulding cycle especially when the materials are under high pressure. We have found that moulds of the type generally known as vertical flash moulds are particularly suitable particularly when it is desired to enlarge the mould cavity. Where there is a possibility of air being trapped between advancing fronts of skin material in the mould cavity, vents may be provided in the mould to allow the trapped air to be expelled.

The size and shape of the mould cavity depends on the article being produced but moulds of maximum cavity thickness less than 25 mm. preferably between 2 mm. and 10 mm. thick, are particularly useful.

The process of the present invention may be used to produce a wide variety of articles. As stated above, the process is particularly useful in the production of mouldings consisting of one thin portion and a thick portion such as shoe soles. Articles with a rigid or with a flexible skin may be prepared by our process. Examples of articles with a rigid skin included articles of furniture and panels which may be building panels or panels to form the bodies of motor vehicles and trains. In addition to shoe soles, examples of articles with a flexible skin which may be prepared include parts of the interior trim of motor cars, railway carriages, caravans, aeroplanes and a wide variety of other applications. In one embodiment of the invention at least part of one or more walls of the mould cavity may be provided, prior to the injection of the materials into the mould cavity, with a removable lining of a material that retains its shape at the temperatures at which the plastics materials are injected into the mould cavity. The plastics materials will then adhere to the lining when they are injected into the mould cavity and the sandwich structure article with the lining firmly bonded thereto can be removed from the mould cavity after solidification of the plastics materials. Thus this technique may be used to provide a rigid backing to, for example, a cellular article having an unfoamed skin. This is particularly useful in the production of flexible mouldings for the interior trim of motor vehicles, where it is desirable to have a resilient trim with a pleasing surface which can be rigidly mounted in the motor vehicle. In this case one of the walls of the mould may be lined to provide the backing to mount the trim whereas the other is not lined thus providing the pleasing surface. Examples of suitable lining materials include wooden sheets such as plywood and hardboard, metal sheets or sheets of thermoplastic materials which retain their shape, i.e. are form stable, at the moulding temperature. Alternatively, the lining could, if desired be of a flexible material such as the upper materials of a shoe or boot on to which the sole is moulded by the process of the present invention.

We claim:

1. A process for the production of an injection moulded article having a core of an injection mouldable synthetic resin material surrounded by a skin of an injection mouldable synthetic resin material at all points away from the sprue area of the moulding wherein the skin and core materials are sequentially injected in a fluid state into a mould cavity through a common sprue channel via feed channels from separate injection barrels by injection rams operating in said barrels so that the core material is injected to within the skin material thereby extending the enveloping skin material to the extremities of the mould cavity, said feed channels, during injection of the skin and core materials, being in communication with each other and with the common sprue channel, and injection of skin material is commenced with the sprue channel end of the core material feed channel filled with skin material, characterized by during injection of skin material, controlling the position of the core material injection ram in dependence on the amount of skin material injected so that skin material is caused to flow up the core material feed channel towards the core injection barrel thereby substantially preventing contamination of the skin material being injected into the mould cavity by the core material, and, during injection of core material, limiting flow of core material up the skin material feed channel to an amount not exceeding that corresponding to the compression of the skin material and any hydraulic fluid maintaining the skin material under pressure whereby contamination of the skin material forming the surface of the article by the core material is substantially prevented.

2. A process as claimed in claim 1 wherein the movement of the core material injection ram is controlled in accordance with the pressure exerted on the skin material by the skin material injection ram.

3. A process as claimed in claim 1 wherein the core material injection ram is hydraulically driven by supplying hydraulic fluid under pressure to a cylinder in which a piston is slidably mounted, one of said cylinder and said piston being connected to said ram and, during injection of the skin material the position of the core material injection ram is controlled by varying the amount of fluid in the cylinder associated with the core material injection ram.

4. A process as claimed in claim 3 wherein control of the movement of the core material injection ram is achieved during skin material injection by releasing hydraulic fluid from the cylinder associated with the core material injection ram through a release valve which operates when the pressure of the fluid in the cylinder associated with the core material injection ram exceeds a level determined by the pressure to which the skin material injection ram is subjected.

5. A process as claimed in claim 4 wherein, at least during injection of skin material, hydraulic fluid is continuously supplied to the cylinder associated with the core material injection ram.

6. A process as claimed in claim 1 wherein flow of core material up the skin material feed channel is limited by preventing movement of the skin material injection ram in a direction away from the feed channel end of the skin material injection barrel during core material injection.

7. A process as claimed in claim 6 wherein movement of the skin material injection ram away from the feed channel end of the skin material injection barrel is prevented by applying to the skin material injection ram a higher pressure than the highest pressure applied to the core material injection ram during injection of the core material.

8. A process as claimed in claim 1 wherein a non-return valve is positioned between the skin material injection barrel and the junction of the feed channels to limit the flow of core material up the skin material feed channel during core material injection by preventing flow of skin material past the non-return valve towards the skin material injection barrel.

9. A process as claimed in claim 1 wherein the skin material injection ram is hydraulically driven by supplying hydraulic fluid under pressure to a cylinder in which a piston is slidably mounted, one of said cylinder and said piston being connected to said ram, and flow of core material up the skin material feed channel is limited, during skin material injection, by preventing release of hydraulic fluid maintaining said cylinder under pressure.

10. A process as claimed in claim 1 wherein, after injection of the core material, a further quantity of skin material is injected so that skin material flows into the sprue channel end of the core material feed channel in readiness for the next injection cycle.

11. A process as claimed in claim 10 wherein the skin material injection ram is a screw injection ram capable of rotational and reciprocating movement and injection of the further amount of skin material is achieved by rotation of the screw while maintaining the skin material injection ram under pressure.

12. A process as claimed in claim 10 wherein the skin material injection ram is halted at the end of the first skin injection step by the engagement of a releasable locking device and is thereby prevented from further forward movement, and, after injection of the core material, the locking device is released thereby permitting further forward movement of the skin material injection ram.

13. A process as claimed in claim 1 wherein injection of the core material is commenced before injection of the skin material is completed.

14. A process as claimed in claim 7 wherein the skin and core material injection rams are hydraulically driven and injection of the core material is commenced before injection of the skin material is completed, after commencement of the injection of the core material, the skin material injection ram is halted, the hydraulic supply to the skin material injection ram is isolated from the supply to the core material injection ram and pressure from an accumulator pressurized to a pressure above the highest pressure applied to the core material injection ram during core material injection is applied to the skin material injection ram.

15. A process as claimed in claim 14 wherein the skin material injection ram is halted by the engagement of a releasable locking device to prevent further forward movement, and, after injection of the core material, the locking device is released thereby permitting further forward movement of the skin material injection ram so as to inject a further quantity of skin material so that skin material flows into the sprue channel end of the core material feed channel in readiness for the next injection cycle and the accumulator is pressurized during injection of the further quantity of skin material.

16. A process as claimed in claim 1 wherein, after injection of the skin and core materials into the mould cavity, the skin and core material injection barrels are isolated from each other.

17. A process as claimed in claim 1 wherein, after injection of the skin and core materials, the mould cavity is isolated from the feed channels.

18. A process as claimed in claim 1 wherein the skin material is nonfoamable and the core material is a foamable composition containing a blowing agent which is injected into the mould cavity at a temperature above the activation temperature of the blowing agent and the core material is permitted to foam in the mould cavity.

19. A process as claimed in claim 18 wherein the amount of foamable composition injected is such that the mould cavity is filled before foaming takes place and the mould cavity is then enlarged to permit foaming.

References Cited
UNITED STATES PATENTS

| | | | |
|---|---|---|---|
| 3,221,373 | 12/1965 | Kwan | 264—328 X |
| 3,690,797 | 9/1972 | Garner | 425—245 X |
| 2,996,764 | 8/1961 | Ross | 264—328 X |
| 3,339,240 | 9/1967 | Corbett | 264—329 X |

FOREIGN PATENTS

| | | | |
|---|---|---|---|
| 452,990 | 1970 | Japan | 264—328 |
| T. 904,007 | 11/1972 | United States | 264—45 |

ROBERT F. WHITE, Primary Examiner

R. R. KUCIA, Assistant Examiner

U.S. Cl. X.R.

264—45, 328, 329

UNITED STATES PATENT OFFICE
CERTIFICATE OF CORRECTION

Patent No. 3,801,684     Dated April 2, 1974

Inventor(s) Klaus Schrewe et al.

It is certified that error appears in the above-identified patent and that said Letters Patent are hereby corrected as shown below:

Add the following to the front page format after the "Assignee";
-- Foreign Application Priority Data
Jan. 28, 1971     Germany     P 21 03 885 7-16 --
Column 6, line 56, "space" should read -- sprue --. Column 7, line 9, "214" should read -- 216 --.

Signed and sealed this 3rd day of December 1974.

(SEAL)
Attest:

McCOY M. GIBSON JR.
Attesting Officer

C. MARSHALL DANN
Commissioner of Patents